(12) United States Patent
Suzuki et al.

(10) Patent No.: US 6,676,156 B2
(45) Date of Patent: Jan. 13, 2004

(54) ELECTRONIC IMPACT SENSOR MOUNTED ON SUPPORTING MEMBER

(75) Inventors: Akira Suzuki, Hekinan (JP); Shinichi Kiribayashi, Anjo (JP); Tadashi Ozaki, Gamagori (JP)

(73) Assignee: Denso Corporation, Kariya (JP)

( * ) Notice: Subject to any disclaimer, the term of this patent is extended or adjusted under 35 U.S.C. 154(b) by 9 days.

(21) Appl. No.: 10/201,157

(22) Filed: Jul. 24, 2002

(65) Prior Publication Data

US 2003/0062207 A1 Apr. 3, 2003

(30) Foreign Application Priority Data

Oct. 1, 2001 (JP) ......................... 2001-305601

(51) Int. Cl.$^7$ .............................................. B60R 21/32
(52) U.S. Cl. ....................................... 280/735; 280/734
(58) Field of Search ................................. 280/735, 734

(56) References Cited

U.S. PATENT DOCUMENTS

| | | | | |
|---|---|---|---|---|
| 4,995,639 A | * | 2/1991 | Breed ......................... | 280/735 |
| 5,007,661 A | * | 4/1991 | Lenzen ....................... | 280/735 |
| 5,549,325 A | * | 8/1996 | Kiribayashi et al. ........ | 280/735 |
| 6,039,139 A | * | 3/2000 | Breed et al. ................ | 180/271 |
| 6,104,100 A | * | 8/2000 | Neuman ...................... | 307/10.1 |
| 6,139,053 A | * | 10/2000 | Knox ......................... | 280/735 |
| 6,325,414 B2 | * | 12/2001 | Breed et al. ................ | 280/735 |
| 6,607,212 B1 | * | 8/2003 | Reimer et al. .............. | 280/735 |

* cited by examiner

Primary Examiner—Christopher P. Ellis
Assistant Examiner—Rashmi Sharma
(74) Attorney, Agent, or Firm—Posz & Bethards, PLC

(57) ABSTRACT

A circuit board having an impact sensor element thereon is mounted on a depressed portion formed between a pair of thick portions of a supporting member. The supporting member includes a pair of protecting walls between which a connector leading out electrical signals from the circuit board is disposed. The supporting member is fixed to a support frame of a vehicle by screws or bolts inserted through the thick portions. The supporting member is formed with a resin material as a unitary body. Since the circuit board and the connector are mounted on the supporting member at positions protected by solid structures of the supporting member, they are prevented from being hit by vehicle parts falling apart when a collision occurs.

5 Claims, 2 Drawing Sheets

ELECTRONIC IMPACT SENSOR MOUNTED ON SUPPORTING MEMBER

CROSS-REFERENCE TO RELATED APPLICATION

This application is based upon and claims benefit of priority of Japanese Patent Application No. 2001-305601 filed on Oct. 1, 2001, the content of which is incorporated herein by reference.

BACKGROUND OF THE INVENTION

1. Field of the Invention

The present invention relates to an electronic impact sensor for an air-bag system protecting passengers from a collision impact of an automotive vehicle.

2. Description of Related Art

An air-bag system for protecting passengers from a collision impact has been used in recent automotive vehicles. An example of a conventional sensor 50 for electronically detecting a collision impact for use in the air-bag system is shown in FIGS. 3A and 3B. The impact sensor is installed in a collision impact receiving space such as an engine compartment.

An impact sensor circuit board 52 is mounted on a resin case 51, and a connector 53 for sending sensor signals to an electronic control unit (not shown) for an air-bag system is connected to a rear side of the resin case 51. When a vehicle collision occurs, an impact sensor on the circuit board 52 detects a collision impact and sends electrical signals to an electronic control unit for controlling operation of an air-bag. The air-bag is inflated for protecting passengers when the detected collision impact exceeds a predetermined level.

In order to obtain the sensor signals without fail in such a collision, the impact sensor 50 itself has to be protected from vehicle structures damaged by the collision. For this purpose, an entire sensor 50 including the circuit board 52 and the connector 53 is encapsulated in a metallic case 54. The encapsulated sensor 50 is connected to a bracket 55. The bracket 55 is mounted on a support frame (not shown) in an engine compartment by screws 56. However, since the entire sensor 50 has to be encapsulated by the metallic case in the conventional structure, a cost for manufacturing the sensor becomes expensive.

SUMMARY OF THE INVENTION

The present invention has been made in view of the above-mentioned problem, and an object of the present invention is to provide an improved electronic impact sensor which is protected from the structures damaged by a collision without using a costly metallic case encapsulating the sensor therein.

A circuit board having an impact sensor element thereon is mounted on a supporting member composed of a mounting base and a protecting member integrally formed with a resin material. The mounting base includes a depressed portion and a pair of thick portions formed at both sides of the depressed portion. Tapered front walls forwardly descending from the depressed portion and the thick portions are formed at the front side thereof. The circuit board is mounted on the depressed portion, so that the circuit board is protected from vehicle structures damaged by a collision impact.

The protecting member having a pair of parallel protecting walls is integrally connected to a rear side of the mounting base. A pair of tapered sidewalls are provided for firmly connecting the protecting member to the mounting base. A connector for leading out electric signals from the circuit board is disposed in the space between the pair of protecting walls, so that the connector is protected by the protecting walls when a vehicle collision occurs.

The supporting member is fixed to a support frame by pair of screws inserted through the thick portions. Each screw is surrounded by a collar tube to enhance its mechanical strength.

Since the circuit board and the connector are disposed in spaces protected by solid structures of the supporting member, they are prevented from being hit by vehicle structures falling apart when a collision occurs without covering them with a metallic case which is conventionally used. Accordingly, the electronic impact sensor can be made compact and manufactured at a low cost.

Other objects and features of the present invention will become more readily apparent from a better understanding of the preferred embodiment described below with reference to the following drawings.

DETAILED DESCRIPTION OF THE PREFERRED EMBODIMENT

Figure 1:
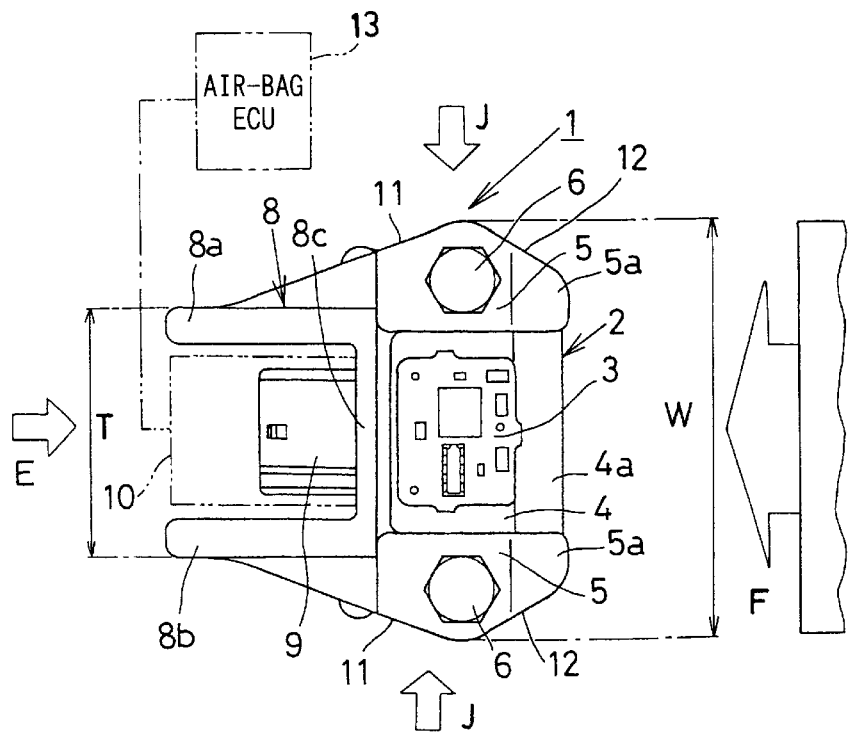
FIG. 1 is a top view showing an electronic impact sensor according to the present invention.

A preferred embodiment of the present invention will be described with reference to FIGS. 1 and 2. An electronic impact sensor 1 (a so-called front satellite sensor) is installed in a vehicle space, such as an engine compartment, that receives a collision impact. An impact sensor circuit board 3 is mounted on a supporting member having a mounting base 2 and a protecting member 8. The supporting member is made of a resin material as a single unit.

The mounting base 2 is composed of a depressed portion 4 on which the sensor circuit board 3 is mounted, a pair of thick portions 5 formed at both sides of the depressed portion 4, tapered front walls 4a, 5a descending from the depressed portion 4 and thick portions 5 toward a front side of the sensor. A screw 6 surrounded by a collar tube 7 is inserted into each thick portion 5 to fix the supporting member to a support frame S in the engine compartment, as shown in FIG. 2.

Figure 2:
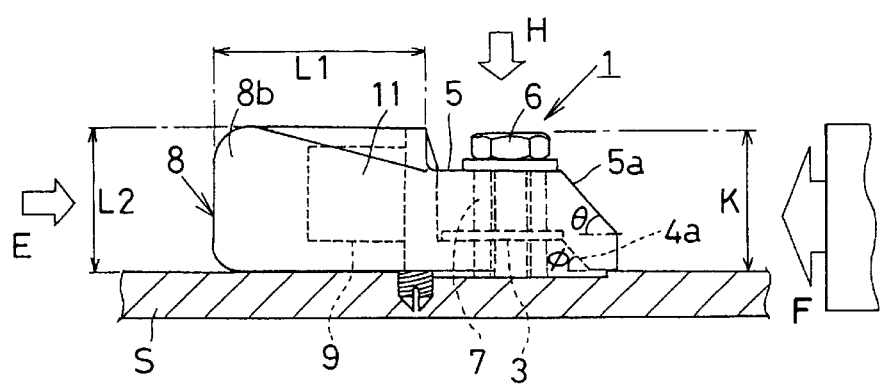
FIG. 2 is a side view showing the electronic impact sensor shown in FIG. 1.
Figure 3B:
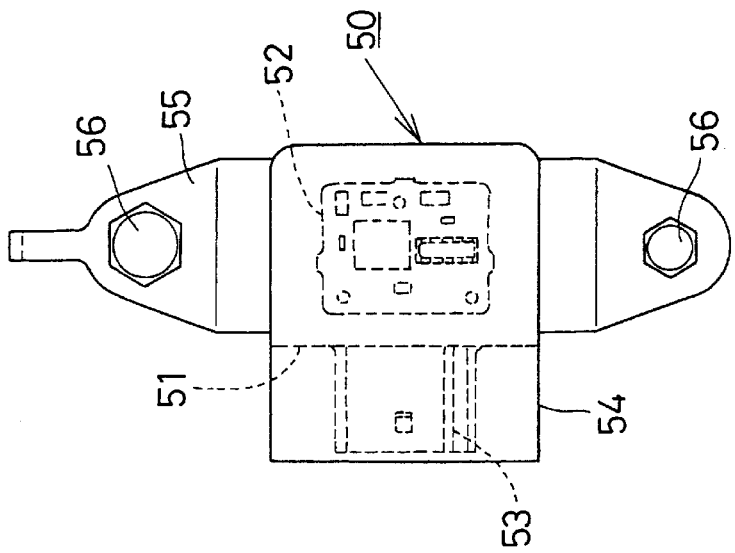
FIG. 3B is a top view showing the conventional electronic impact sensor shown in FIG. 3A.
Figure 3A:
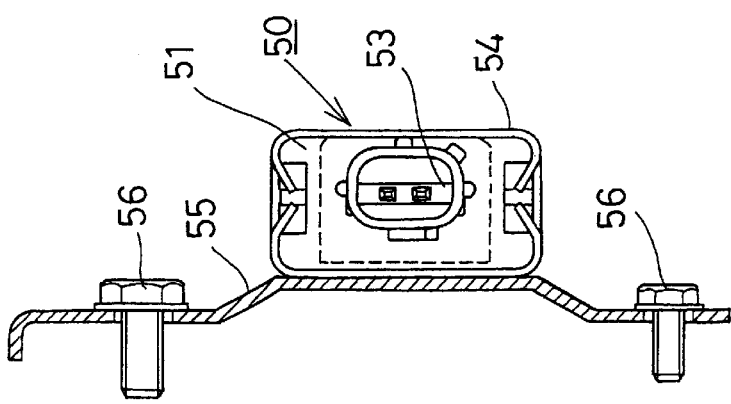
FIG. 3A is a side view showing a conventional electronic impact sensor.

The tapered front walls 5a formed at respective front ends of the thick portions 5 and another tapered front wall 4a formed at the front end of the depressed portion 4 make a taper angle of 10–45°, as shown in FIG. 2. That is, both of the taper angle θ of the tapered front walls 5a and the taper angle φ of the tapered front wall 4a are made between 10 to 45°. Those taper angles may be arbitrarily changed to match actual installment conditions and an expected amount of a collision impact.

At the rear side of the mounting base 2, a protecting member 8 having a U-like-shape is formed integrally with the mounting base 2. The protecting member 8 includes a lateral wall 8c and a pair of protecting walls 8a, 8b formed at both sides of the lateral wall 8c. A width T including both protecting walls 8a, 8b is made smaller than a width W of the mounting base 2, as shown in FIG. 1.

A connector 9 for electrically connecting the impact sensor to the electronic control unit 13 of the air-bag system is mounted on the lateral wall 8c, so that the connector 9 is surrounded by the pair of protecting walls 8a, 8b. Another connector 10 led out from the electronic control unit 13 is coupled to the connector 9 in the space between the pair of protecting walls 8a, 8b. As shown in FIG. 2, a length L1 of the protecting walls 8a, 8b and a height L2 thereof are made to accommodate both connectors 9 and 13 therein. In this manner, both connectors 9 and 13 are protected from structures damaged by a collision impact. The height L2 of the protecting walls 8a, 8b is made about the same as a height K of the screws 6, as shown in FIG. 2.

Both protecting walls 8a, 8b are connected to the thick portions 5a by respective tapered sidewalls 11 to enhance their mechanical strength, as shown in FIGS. 1 and 2. Further, the tapered front walls 5a are connected to the thick portions 5 by respective tapered sidewalls 12. Since the impact sensor circuit board 3 is mounted on the depressed portion 4 protected by the pair of thick portions 5 and the protecting member 8, vehicle structures damaged by a collision impact do not directly hit the circuit board 3.

The collision impact applied to the sensor from its top in a direction H shown in FIG. 2 is received by the screws 6 having a high strength, the collar tube 7, the pair of thick portions 5 and the protecting member 8. The collision impact from the front side in a direction F shown in FIGS. 1 and 2 is received by both thick portions 5 and the respective tapered front walls 5a, 4a, thereby dispersing and alleviating the collision impact. The collision impact applied from the rear side in a direction E shown in FIGS. 1 and 2 is received by the protecting walls 8a, 8b. Similarly, the impact from both sides in a direction J shown in FIG. 1 is received by the thick portions 5 and the protecting member 8.

Thus, the collision impact applied to the sensor in various directions is received and alleviated by the structures of the supporting member having a high strength, and thereby the circuit board 3 and the connectors 9, 13 are protected from the collision impact without using a conventional metallic case. Accordingly, a cost of the metallic cover and a cost for encapsulating the sensor components in the metallic cover are eliminated.

The electronic impact sensor described above may be used in passenger-protecting devices other than the air-bag system. The present invention is not limited to the embodiment described above, but it may be variously modified. For example, the height K of the screws 6 may be made a little higher than the height L2 of the protecting walls 8a, 8b. The screws 6 for fixing the supporting member to the support frame S may be replaced with other fixing members such as bolts or pins. The position where the electronic impact sensor is installed is not limited to the engine compartment, it may be installed in other places where the collision impact is detected.

While the present invention has been shown and described with reference to the foregoing preferred embodiment, it will be apparent to those skilled in the art that changes in form and detail may be made therein without departing from the scope of the invention as defined in the appended claims.

What is claimed is:

1. An electronic impact sensor comprising a supporting member and an impact sensor circuit board mounted on the supporting member, the supporting member comprising:

a mounting base having a depressed portion on which the impact sensor circuit board is mounted, a pair of thick portions formed at both sides of the depressed portions for fixing the supporting member on a support frame by inserting fixing members through the thick portions, and tapered front walls formed at a front side of the depressed portion and the pair of thick portions, the tapered front walls descending forward from the front side; and a substantially U-shaped protecting member formed at a rear side of the mounting base for protecting an electrical connector disposed therein, the protecting member having a pair of protecting walls extending from the mounting base toward the rear side thereof.

2. The electronic impact sensor as in claim 1, wherein:

a width of the mounting base is wider than an outside width of the pair of protecting walls.

3. The electronic impact sensor as in claim 2, wherein:

the pair of thick portions are connected to the pair of protecting walls by tapered sidewalls formed at both sides thereof.

4. The electronic impact sensor as in claim 1, wherein:

each fixing member is composed of a screw surrounded by a collar tube.

5. The electronic impact sensor as in claim 1, wherein:

the mounting base and the protecting member are integrally formed with a resin material, forming the supporting member as a single unit.

\* \* \* \* \*